(12) United States Patent
Hiji et al.

(10) Patent No.: US 9,348,193 B2
(45) Date of Patent: May 24, 2016

(54) DISPERSION LIQUID FOR ELECTROPHORETIC DISPLAY, DISPLAY MEDIUM, AND DISPLAY DEVICE

(71) Applicant: E INK CORPORATION, Billerica, MA (US)

(72) Inventors: Naoki Hiji, Kanagawa (JP); Ryota Mizutani, Kanagawa (JP); Chikara Manabe, Kanagawa (JP); Cao Jun, Kanagawa (JP); Toshihide Aoshima, Shizuoka (JP); Daisuke Nakayama, Kanagawa (JP); Yasuo Yamamoto, Kanagawa (JP)

(73) Assignee: E INK CORPORATION, Billerica, MA (US)

( * ) Notice: Subject to any disclaimer, the term of this patent is extended or adjusted under 35 U.S.C. 154(b) by 406 days.

(21) Appl. No.: 13/718,741

(22) Filed: Dec. 18, 2012

(65) Prior Publication Data

US 2013/0222885 A1 Aug. 29, 2013

(30) Foreign Application Priority Data

Feb. 27, 2012 (JP) ................................. 2012-040670

(51) Int. Cl.
*G02F 1/167* (2006.01)

(52) U.S. Cl.
CPC ........ *G02F 1/167* (2013.01); *G02F 2001/1678* (2013.01)

(58) Field of Classification Search
USPC ....................................................... 252/581
See application file for complete search history.

(56) References Cited

U.S. PATENT DOCUMENTS

| 6,693,621 B1* | 2/2004 | Hayakawa et al. ........... 345/107 |
| 2002/0146572 A1 | 10/2002 | Yanagisawa |

FOREIGN PATENT DOCUMENTS

| JP | 2001-188269 A | 7/2001 |
| JP | 2002-338642 A | 11/2002 |
| JP | 2003186063 A | 7/2003 |
| JP | 2005-128141 A | 5/2005 |
| JP | 2005-140835 A | 6/2005 |
| JP | 2009037185 A | 2/2009 |
| JP | 2009-134010 A | 6/2009 |

OTHER PUBLICATIONS

Communication dated Oct. 6, 2015 from the Japanese Patent Office in counterpart application No. 2012-040670.
Communication dated Nov. 2, 2015, issued by the Taiwanese Intellectual Property Office in counterpart Taiwanese Application No. 102101598.

* cited by examiner

*Primary Examiner* — Ling Choi
*Assistant Examiner* — Thuy-Ai Nguyen
(74) *Attorney, Agent, or Firm* — David J. Cole (57) ABSTRACT

There is provided a dispersion liquid for electrophoretic display, containing a dispersion medium 50, a colored electrophoretic particle group 34 that is dispersed in the dispersion medium and migrates in the dispersion medium according to an electric field, a non-electrophoretic particle group 36 that is dispersed without migrating in the dispersion medium and has a color different from that of the electrophoretic particle group, and a compound having a neutral polar group and a hydrophobic group, which is contained in the dispersion medium in a ratio of about 0.01 to about 1 mass % based on the entire dispersion liquid.

8 Claims, 2 Drawing Sheets

DISPERSION LIQUID FOR ELECTROPHORETIC DISPLAY, DISPLAY MEDIUM, AND DISPLAY DEVICE

CROSS-REFERENCE TO RELATED APPLICATIONS

This application is based on and claims priority under 35 USC 119 from Japanese Patent Application No. 2012-040670 filed on Feb. 27, 2012.

BACKGROUND

1. Field

The present invention relates to a dispersion liquid for electrophoretic display, a display medium, and a display device.

2. Description of the Related Art

There has been proposed a display device where a dispersion liquid prepared by dispersing two or more kinds of particles differing in the charging characteristics and color in a dispersion medium is disposed between a pair of electrodes arranged to face each other and a display is performed by applying a voltage between the electrodes and thereby moving a part of the particles in the dispersion liquid.

For example, JP-A-2001-188269 (the term "JP-A" as used herein means an "unexamined published Japanese patent application") discloses a liquid for electrophoretic display, including a liquid medium containing (A) one or more kinds of colored particles differing in the color tone and (B) one or more kinds of colored particles differing in the color tone, wherein the colored particle (A) contains (A) a colored particle capable of moving in the dispersion medium in correspondence to a given electric field applied from outside and (B) a colored particle incapable of moving in the dispersion medium when a given electric field is applied from outside.

JP-A-2002-338642 discloses an image display medium containing a dispersion liquid between two electrically conductive layers disposed with a desired spacing, at least one or both of which are light-transmitting, the dispersion liquid being composed of a silicone oil solvent and a white or colored particle having an acidic group at least on the surface but not having a basic group.

JP-A-2005-128141 discloses an electrophoretic display medium including an electrically insulating carrier liquid having dispersed therein at least one or more kinds of electrophoretic particles, wherein the electrically insulating carrier liquid contains a specific silicone-based compound.

JP-A-2005-140835 discloses a dispersion liquid for electrophoretic display, containing a solvent, a pigment and a dispersant, wherein the dispersant is a block copolymer composed of block A having hydrophilicity and block B having hydrophobicity.

JP-A-2009-134010 discloses a particle dispersion liquid having dispersed therein a particle group capable of moving according to an electric field, in which the particle dispersion liquid contains a carboxyl-modified silicone oil and a first solvent containing at least either one of a silicone oil and a paraffin-based hydrocarbon solvent.

SUMMARY

<1> A dispersion liquid for electrophoretic display, containing:
a dispersion medium,
a colored electrophoretic particle group that is dispersed in the dispersion medium and migrates in the dispersion medium according to an electric field,
a non-electrophoretic particle group that is dispersed without migrating in the dispersion medium and has a color different from that of the electrophoretic particle group, and
a compound having a neutral polar group and a hydrophobic group, which is contained in the dispersion medium in a ratio of about 0.01 to about 1 mass % based on the entire dispersion liquid.

BRIEF DESCRIPTION OF THE DRAWINGS

FIG. 2 is a schematic configuration view showing the configuration of the cell for evaluation produced in Examples, wherein

10 denotes Display device, 12 denotes Display medium, 16 denotes Voltage applying part, 18 denotes Control part, 20 denotes Display substrate, 22 denotes Back surface substrate, 24 denotes Spacing member, 34 denotes Electrophoretic particle group, 36 denotes Non-electrophoretic particle group, 38 denotes Display-side supporting substrate, 40 denotes Display-side electrode, 42 denotes Surface layer, 44 denotes Back surface-side supporting substrate, 46 denotes Surface layer, 48 denotes Back surface-side electrode and 50 denotes Dispersion medium.

DETAILED DESCRIPTION

The dispersion liquid for electrophoretic display according to an exemplary embodiment of the present invention, and a display medium and a display device each using the dispersion liquid are described as one example by appropriately referring to the drawings.

<Dispersion Liquid for Electrophoretic Display>

The dispersion liquid for electrophoretic display (sometimes referred to as "display dispersion liquid" according to this exemplary embodiment is configured to contain a dispersion medium, a colored electrophoretic particle group that is dispersed in the dispersion medium and migrates in the dispersion medium according to an electric field, a non-electrophoretic particle group that is dispersed without migrating in the dispersion medium and has a color different from that of the electrophoretic particle group, and a compound having a neutral polar group and a hydrophobic group, which is contained in the dispersion medium in a ratio of 0.01 to 1 mass % or about 0.01 to about 1 mass % based on the entire dispersion liquid.

The present inventors have found that a display dispersion liquid where a compound having a neutral polar group and a hydrophobic group is contained in the dispersion medium in a ratio of 0.01 to 1 mass % or about 0.01 to about 1 mass % based on the entire dispersion liquid makes it possible to reduce the proportion of reverse-polarity electrophoretic particles while keeping the non-migrating property of the non-electrophoretic particle group.

The reason therefor is not clearly known but is presumed as follows.

The display dispersion liquid for use in an electrophoretic display device contains one or more kinds of colored electrophoretic particle groups, and the electrophoretic particle group of the same color is imparted with the same polarity and caused to move toward the display side or back surface side upon application of a voltage, whereby a display is performed. However, a particle having a polarity reverse to the polarity that the particle should have originally is usually present in a part of the electrophoretic particle group of the same color. As the proportion of electrophoretic particles having a polarity reverse to the original polarity is increased, there is incurred deterioration of the display performance, such as decrease in the reflectance during bright display or reduction of the contrast.

However, by virtue of containing a compound having a neutral polar group and a hydrophobic group in the display dispersion liquid in a given ratio, the compound having a neutral polar group and a hydrophobic group is considered to electrically charge the electrophoretic particle having a reverse polarity and thereby regulate its polarity to the polarity that the particle should have originally.

Figure 1:
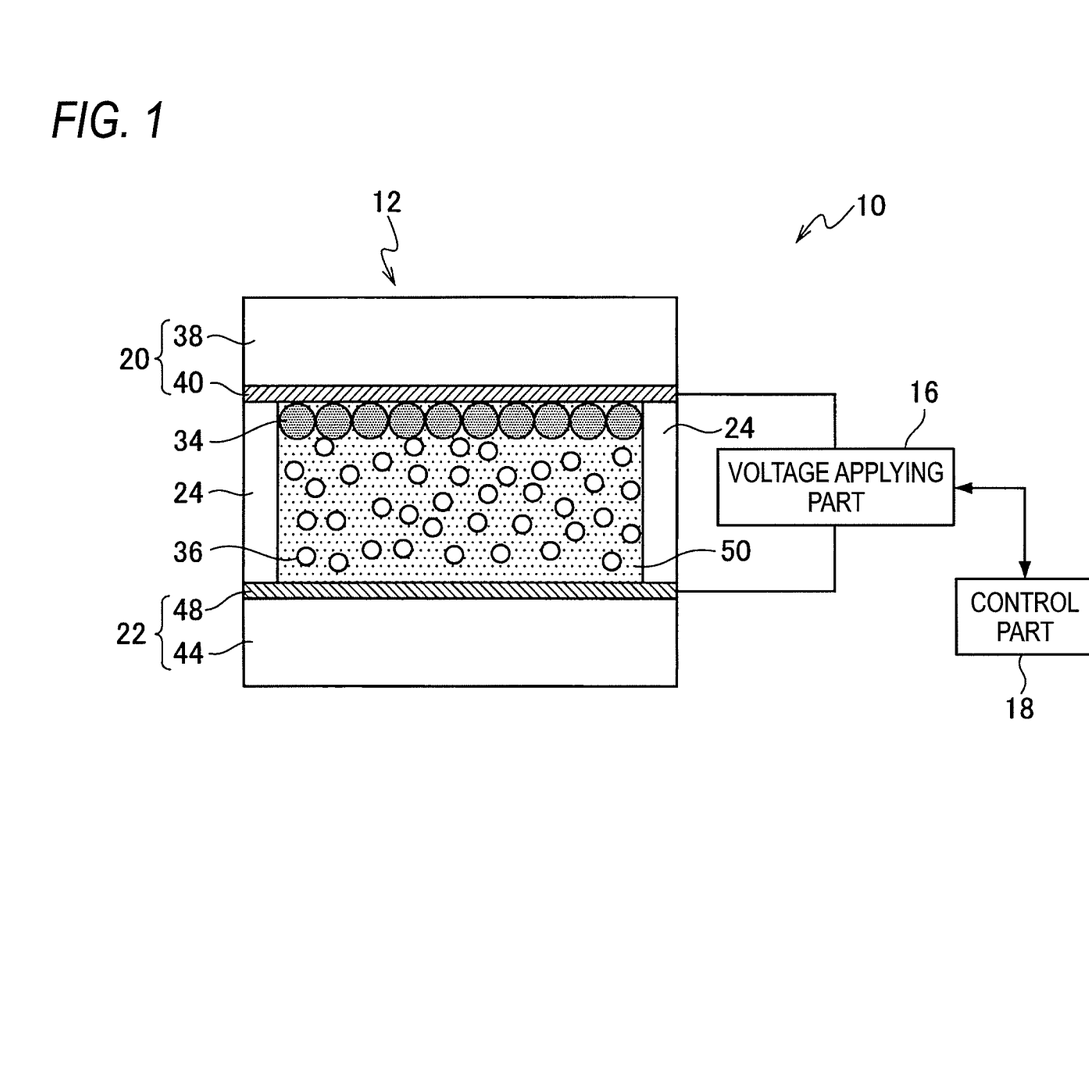
FIG. 1 is a schematic configuration view showing one example of the display device according to this exemplary embodiment.

FIG. 1 shows one example of the display device using the dispersion liquid for electrophoretic display according to this exemplary embodiment. The display device 10 shown in FIG. 1 is configured to include a display medium 12 and a voltage applying part 16 that applies a voltage to the display medium 12 to form an electric field between a display substrate 20 and a back surface substrate 22 of the display medium 12. Incidentally, in FIG. 1, a part (one cell) of a display medium 12 is shown in an enlarged manner.

The display medium 12 includes a display-side supporting substrate 38, a back surface-side supporting substrate 44, a display-side electrode 40, a back surface-side electrode 48, and a spacing member 24, where the display-side supporting substrate 38 and the display-side electrode 40 constitute a display substrate 20 and the back surface-side supporting substrate 44 and the back surface-side electrode 48 constitute a back surface substrate 22.

The construction is completed by filling a cell (a region between the pair of electrodes 40 and 48) that is a closed space surrounded by the pair of substrates 20 and 22 and the spacing member 24, with the dispersion liquid for electrophoretic display of the present invention containing a dispersion medium 50, an electrophoretic particle group 34, a non-electrophoretic particle group 36, and a compound having a neutral polar group and being dissolved in the dispersion medium in a ratio of 0.01 to 1 mass % or about 0.01 to about 1 mass % based on the entire dispersion liquid.

The display-side supporting substrate 38 serves as an image display surface and has light transparency (specifically, for example, the transmittance for visible light is 70% or more).

The back surface-side supporting substrate 44 serving as a non-display surface is disposed to face the display-side supporting substrate 38 with spacing. Incidentally, the back surface-side supporting substrate 44 need not necessarily have light transparency.

Examples of the material constituting the display-side supporting substrate 38 and the back surface-side supporting substrate 44 include glass and plastics such as polyethylene terephthalate resin, polyethylene naphthalate resin, polycarbonate resin, acrylic resin, polyimide resin, polyester resin, epoxy resin and polyethersulfone resin.

On the insides (opposing sides) of the display-side supporting substrate 38 and the back surface-side supporting substrate 44, the display-side electrode 40 and the back surface-side electrode 48 are provided, respectively.

Examples of the material constituting the display-side electrode 40 and the back surface-side electrode 48 include an oxide of indium, tin, cadmium, antimony or the like, a composite oxide such as ITO, a metal such as gold, silver, copper and nickel, and an organic material such as polypyrrole and polythiophene. Such a material constitutes the electrodes 40 and 48, for example, as a single-layer film, a mixed film or a composite film.

The display-side electrode 40 and the back surface-side electrode 48 have a thickness of, for example, from 10 to 500 nm.

The display-side electrode 40 and the back surface-side electrode 48 may be formed, for example, in a matrix manner or a stripe manner.

The display-side electrode 40 and the back surface-side electrode 48 are electrically connected to the voltage applying part 16.

The voltage applying part 16 is connected to the control part 18 to allow signal communication therebetween.

The control part 18 may be constructed as a microcomputer including CPU (central processing unit) for governing the operation of the entire device, RAM (Random Access Memory) for temporarily storing various data, and ROM (Read Only Memory) in which various programs such as control program for controlling the entire device are previously stored.

The voltage applying part 16 has a function of applying a voltage to the display-side electrode 40 and the back surface-side electrode 48 according to the control of the control part 18. A voltage is applied between the display-side electrode 40 and the back surface-side electrode 48 by the voltage applying part 16, whereby an electric field is formed between the display-side electrode 40 and the back surface-side electrode 48.

The voltage applying part 16 of the display device 10 may be detachably connected to the display medium 12 (the display-side electrode 40 and the back surface-side electrode 48). In this case, there is employed, for example, a configuration where the display medium 12 and the voltage applying part 16 are connected to display the image information when the display medium 12 needs to be rewritten or displayed, and are separated from one another during storage to facilitate the transport of the display medium 12.

The display medium 12 of this exemplary embodiment is configured to include a display-side electrode 40 and a back surface-side electrode 48 and connect both electrodes to a voltage applying part 16, but the present invention is not limited thereto, and there may be also employed a configuration where one of the display-side electrode 40 and the back surface-side electrode 48 is connected to ground and another is connected to the voltage applying part 16.

Furthermore, in order to protect the display-side electrode 40 and the back surface-side electrode 48, a surface layer covering each electrode 40 or 48 may be provided using fluororesin or the like.

The gap between the display substrate 20 and the back surface substrate 22 (between the display-side electrode 40 and the back surface-side electrode 48) is partitioned into a plurality of closed spaces (cells) by a spacing member 24. The spacing member 24 has a function of holding the gap between substrates of the display substrate 20 and the back surface substrate 22 and partitioning the gap between substrates of the display substrate 20 and the back surface substrate 22 into a plurality of cells.

Examples of the material constituting the spacing member 24 include a thermoplastic resin, a thermosetting resin, an electron beam-curable resin, a photocurable resin, rubber, and a metal.

The spacing member 24 may be either colored or colorless but is preferably colorless and transparent so as not to adversely affect the display image displayed on the display medium 12, and in this case, for example, a transparent resin such as polystyrene, polyester and acryl is used. Incidentally, the term "transparent" as used herein means to have a transmittance of 50% or more for visible light.

—Dispersion Medium—

The dispersion medium 50 includes, for example, an insulating liquid. The "insulating" as used in this exemplary embodiment specifically indicates, as one example, that the volume resistivity is $10^7$ Ω·cm or more.

The dispersion medium includes a silicone-based oil and a hydrocarbon-based oil, and specific preferred examples thereof include a silicone-based oil such as straight silicone oil (e.g., dimethyl silicone oil, methyl phenyl silicone oil, methyl hydrogen silicone oil), cyclic dimethyl silicone oil and modified silicone oil; a hydrocarbon-based oil such as hexane, cyclohexane, toluene, xylene, decane, hexadecane, kerosene, paraffin, isoparaffin, dichloroethylene, trichloroethylene, perchloroalkanes (e.g., perchloroethylene), perfluoroalkanes (e.g., perfluorohexane, perfluorooctane, perfluorodecane) and high-purity petroleum; and a mixture thereof.

The volume resistivity of the dispersion medium 50 is suitably, for example, $10^7$ Ω·cm or more, preferably from $10^7$ to $10^{19}$ Ω·cm, more preferably from $10^{10}$ o $10^{19}$ Ω·cm. With a volume resistivity in this range, an electric field is applied to the electrophoretic particle group 34 and at the same time, generation of bubbles due to electrolysis of the dispersion medium 50 induced by an electrode reaction is suppressed.

—Electrophoretic Particle Group—

The electrophoretic particle group 34 consists of a plurality of electrophoretic particles each being positively or negatively charged and is a solid particle group exhibiting an electrophoretic property in the dispersion medium 50 and having a color different from that of the non-electrophoretic particle group 36. That is, the particle has a large positive or negative charge in the dispersion medium 50 and moves in the dispersion medium 50 according to the direction and intensity of an electric field generated between the display-side electrode 40 and the back surface-side electrode 48 (namely, between substrates of the display substrate 20 and the back surface substrate 22), over a greatly long migration distance as compared with the non-electrophoretic group 36.

Incidentally, the color of the electrophoretic particle group 34 may be sufficient if it is a color different from that of the non-electrophoretic group 36, and the color is not particularly limited.

The change of display color in the display medium 12 is produced by the movement in the dispersion medium 50 of respective electrophoretic particles constituting the electrophoretic particle group 34.

Examples of each electrophoretic particle of the electrophoretic particle group 34 include a glass bead, an insulating metal oxide particle such as alumina and titanium oxide, a thermoplastic or thermosetting resin particle, a particle obtained by fixing a coloring agent on the surface of such a resin particle, a particle containing a coloring agent in a thermoplastic or thermosetting resin, and a metal colloid particle having a plasmon color development function.

Examples of the thermoplastic resin for use in the production of the electrophoretic particle include homopolymers or copolymers of styrenes such as styrene and chlorostyrene, monoolefins such as ethylene, propylene, butylene and isoprene, vinyl esters such as vinyl acetate, vinyl propionate, vinyl benzoate and vinyl butyrate, α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, vinyl ethers such as vinyl methyl ether, vinyl ethyl ether and vinyl butyl ether, and vinyl ketones such as vinyl methyl ketone, vinyl hexyl ketone and vinyl isopropenyl ketone.

Examples of the thermosetting resin for use in the production of the electrophoretic particle include a crosslinked copolymer with the main component being divinyl benzene, a crosslinked resin such as crosslinked polymethyl methacrylate, a phenol resin, a urea resin, a melamine resin, a polyester resin, and a silicone resin. In particular, examples of the representative binder resin include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, a polyethylene, a polypropylene, a polyester, a polyurethane, an epoxy resin, a silicone resin, a polyamide, a modified rosin, and paraffin wax.

The coloring agent which can be used includes, for example, an organic or inorganic pigment and an oil-soluble dye, and examples thereof include known coloring agents such as magnetic powder (e.g., magnetite, ferrite), carbon black, titanium oxide, magnesium oxide, zinc oxide, phthalocyanine copper-based cyan color material, azo-based yellow color material, azo-based magenta color material, quinacridone-based magenta color material, red color material, green color material and blue color material. Specifically, representative examples thereof include Aniline Blue, Calco Oil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3.

In the resin of the electrophoretic particle, a charge control agent may be mixed, if desired. As the charge control agent, known charge control agents employed in electrophotographic toner materials can be used, and examples thereof include cetylpyridyl chloride, a quaternary ammonium salt such as BONTRON P-51, BONTRON P-53, BONTRON E-84 and BONTRON E-81 (all produced by Orient Chemical Industries, Co., Ltd.), a salicylic acid-based metal complex, a phenolic condensate, a tetraphenyl-based compound, a metal oxide particle, and a metal oxide particle surface-treated with a coupling agent of various types.

If desired, an external additive may be attached to the surface of the electrophoretic particle. The color of the external additive is preferably transparent so as not to affect the color of the electrophoretic particle.

As the external additive, an inorganic particle of, for example, a metal oxide such as silicon oxide (silica), titanium oxide and alumina is used. In order to adjust the chargeability, fluidity, environmental dependency and the like of the particle, such a particle may be surface-treated with a coupling agent or a silicone oil.

The coupling agent includes a positively charging coupling agent such as aminosilane-based coupling agent, aminotitanium-based coupling agent and nitrile-based coupling agent, and a negatively charging coupling agent such as silane-based coupling agent free from nitrogen atom (composed of an atom except for nitrogen), titanium-based coupling agent, epoxy silane coupling agent and acryl silane coupling agent. Also, the silicone oil includes a positively charging silicone oil such as amino-modified silicone oil, and a negatively charging silicone oil such as dimethyl silicone oil, alkyl-modified silicone oil, α-methylsulfone-modified silicone oil, methylphenyl silicone oil, chlorophenyl silicone oil and fluorine-modified silicone oil. These are selected according to the desired resistance of the external additive.

Among these external additives, well-known hydrophobic silica and hydrophobic titanium oxide are preferred. In particular, a titanium compound described in JP-A-10-3177, which obtained by a reaction of $TiO(OH)_2$ with a silane compound such as silane coupling agent, is preferred. The silane compound may be any type of chlorosilane, alkoxysilane, silazane and special silylating agent. The titanium compound is produced by reacting a silane compound or a silicone oil with $TiO(OH)_2$ obtained in the course of a wet process and drying the reaction product. Because of not passing through a firing process at several hundreds of degrees centigrade, a strong bond of Ti's to each other is not formed, and aggregation does not occur at all, as a result, the electrophoretic particle is in a primary particle state. Furthermore, a silane compound or a silicone oil is directly reacted with $TiO(OH)_2$, so that the processing amount of the silane compound or silicone oil can be increased and not only the charging characteristics can be controlled by adjusting the processing amount or the like of the silane compound but also the imparted charging ability can be improved more significantly than that of the conventional titanium oxide.

The primary particle diameter of the external additive is generally from 1 to 100 nm, preferably from 5 to 50 nm, but the present invention is not limited thereto.

The blending ratio of the external additive to the electrophoretic particle is adjusted in view of balance between the particle diameter of the electrophoretic particle and the particle diameter of the external additive. If the amount of the external additive added is too large, the external additive is at least partially liberated from the electrophoretic particle surface and attaches to the surface of another electrophoretic particle, as a result, desired charging characteristics cannot be obtained. In general, the amount of the external additive is preferably from 0.01 to 3 parts by mass, or from 0.05 to 1 part by mass, based on 100 parts by mass of the electrophoretic particle.

In the case of using a plurality of kinds of electrophoretic particles differing in the color, the external additive may be added to only any one kind of an electrophoretic particle out of the plurality of kinds or may be added to several kinds or all kinds of electrophoretic particles.

In the case of adding the external additive to the surfaces of all electrophoretic particles, it is preferred to firmly fix the external additive on the electrophoretic particle surface by implanting the external additive on the electrophoretic particle surface with impact force or by heating the electrophoretic particle surface. This firm fixing makes it possible to prevent liberation of the external additive from the electrophoretic particle and keep the external additives with different polarities from strongly aggregating to form an external additive aggregate that can be hardly dissociated by an electric field, and in turn, image quality deterioration is avoided.

The electrophoretic particle group 34 may be sufficient if it is a particle group having a color appropriate for the image formed. The electrophoretic particle group 34 may be, for example, one kind of a particle group (one color) or a plurality of kinds of particle groups (a plurality of colors, for example, Y: yellow, C: cyan, and M: magenta).

Examples of the electrophoretic particle group 34 include a glass bead, an insulating metal oxide particle such as alumina and titanium oxide, a thermoplastic or thermosetting resin particle, a particle obtained by fixing a coloring agent on the surface of such a resin particle, a particle containing an insulating coloring agent in a thermoplastic or thermosetting resin, and a metal colloid particle having a plasmon color development function.

In the resin constituting the electrophoretic particle group 34, for example, a charge control agent that controls the chargeability may be mixed, if desired. Also, a magnetic material may be mixed in the inside or surface of the electrophoretic group 34, if desired. Furthermore, an external additive may be attached to the surface of the electrophoretic particle group 34, if desired.

The method for producing the electrophoretic particle group 34 includes conventionally known methods.

For example, there is used a method where, as described in JP-A-7-325434, a resin, a pigment and a charge control agent are weighed to give the objective mixing ratio, the pigment is added, mixed and dispersed in the resin after melting the resin by heating, the dispersion is cooled and then pulverized by using a pulverizer such as jet mill, hammer mill and turbomill to prepare a particle, and the obtained particle is dispersed in a dispersion medium.

Also, a particle-dispersed medium may be produced by preparing a particle containing a charge control agent by a polymerization method such as suspension polymerization, emulsion polymerization and dispersion polymerization, or a coacervation, melt dispersion or emulsion coagulation method, and then dispersing the particle in a dispersion medium.

Furthermore, there is a method using an appropriate apparatus where raw materials, i.e., a resin, a coloring agent, a charge control agent and a dispersion medium, are dispersed and kneaded at a temperature that is low enough to keep the plasticity of the resin and cause no boiling of the dispersion medium and is lower than a decomposition temperature of at least one of the resin, the charge control agent and the coloring agent. Specifically, a pigment, a resin and a charge control agent are heated and melted in a dispersion medium by using a planetary mixer, a kneader or the like, and the melt mixture is cooled with stirring to cause coagulation/precipitation by utilizing the temperature dependency of the solubility of the resin for a solvent, whereby an electrophoretic particle is produced.

In addition, a method of charging the above-described raw materials into an appropriate vessel with particulate media for dispersion and kneading, for example, into an attritor or a heated vibration mill such as heated ball mill, and dispersing and kneading the materials by setting the vessel at a desired temperature range of, for example, from 80 to 160° C., may be used. Preferred examples of the particulate media which can be used include a steel such as stainless steel and carbon steel, alumina, zirconia and silica. For producing an electrophoretic particle by this method, previously fluidized raw materials are further dispersed in the vessel by means of the particulate media, and the dispersion medium is then cooled to precipitate a resin containing the coloring agent from the dispersion medium. The particulate media continuously maintain the moving state during cooling and after cooling, generate shear and/or impact forces to reduce the particle diameter.

The content of the electrophoretic particle group 34 (the content (mass %) based on the entire mass in the cell) is not particularly limited as long as the content is large enough to give a concentration at which a desired color hue is obtained, and it is effective as the display medium 12 to adjust the content according to the thickness of the cell (that is, the distance between substrates of the display substrate 20 and the back surface substrate 22). That is, in order to obtain a desired color hue, the content becomes smaller as the thickness of the cell is larger, and the content is larger as the thickness of the cell is smaller. In general, the content is from 0.01 to 50 mass %.

The volume average particle diameter of particles of the electrophoretic particle group 34 is, for example, from 0.1 to 20 µm. Here, the volume average particle diameter of electrophoretic particles is a value measured by an SEM or TEM image.

Incidentally, in the case of containing two or more kinds of electrophoretic particle groups 34 differing in the color, the particle diameter of the electrophoretic particle may be the same or different among respective particle groups.

—Non-Electrophoretic Particle Group—

The non-electrophoretic particle group 36 is a solid particle group having a color different from that of the electrophoretic particle group 34 and not exhibiting an electrophoretic property in the dispersion medium 50. That is, the non-electrophoretic particle group 36 is a particle group not having an electric charge in the dispersion medium 50, a particle group having a small positive or negative charge but being not caused to move in the dispersion medium 50 by an electric field generated between the display-side electrode 40 and the back surface-side electrode 48, or a particle group that can be regarded as not migrating (moving) because even when moved, the average migration distance is very small as compared with the electrophoretic particle group 34.

When an electric field is generated between the display substrate 20 and the back surface substrate 22 (between display-side electrode 40 and the back surface-side electrode 48), respective particles of the electrophoretic particle group 34 migrate (move) through the gap of the non-electrophoretic particle group 36 from the back surface substrate 22 side to the display substrate 20 side or from the display substrate 20 side to the back surface substrate 22 side, whereby a display is performed.

The color of each non-electrophoretic particle constituting the non-electrophoretic particle group 36 may be sufficient if it is a color different from the color of each electrophoretic particle of the electrophoretic particle group 34. For example, a white or black color is preferably selected to create a background color, but other colors may be also used. In addition, the non-electrophoretic group 36 may be sufficient if it is a solid particle group incapable of moving in the dispersion medium 50 or capable of being regarded as not migrating (moving) because even when moved, the average migration distance is very small as compared with the electrophoretic group 34, and this particle group may be a particle group not having an electric charge in the dispersion medium 50 (that is, a particle group that does not move in accordance with an electric field), or a particle group having a small positive or negative charge (a particle group that slightly moves in accordance with an electric field).

In the case of composing the non-electrophoretic particle group 36 of a white particle, examples of the particle include, in terms of the constituent material, a particle obtained by dispersing a white pigment (such as titanium oxide, silicon oxide and zinc oxide) in a resin (such as polystyrene resin, polyethylene resin, polypropylene resin, polycarbonate resin, polymethyl methacrylate resin (PMMA), acrylic resin, phenolic resin and formaldehyde condensate), and a resin particle such as polystyrene, polyethylene and vinylnaphthalene.

In the case where a particle other than a white particle is applied as the particle of the non-electrophoretic particle group 36, the above-described resin particle having incorporated therein a pigment or dye of a desired color may be used. The pigment or dye having, for example, RGB or YMC colors includes general pigments or dyes used for printing inks or color toners.

The volume average particle diameter of particles of the non-electrophoretic particle group 36 is, for example, from 0.1 to 20 μm. The volume average particle diameter of non-electrophoretic particles is a value measured by an SEM or TEM image.

In the case of forming an image, the voltage applying part 16 applies a voltage to the display-side electrode 40 and the back surface-side electrode 48 according to an image formed, as a result, the electrophoretic particle group 34 is positioned on the display substrate 20 side according to the position at which an image is formed in response to an electric field generated in the cell, whereby an image is formed. On the other hand, the portion in which the electrophoretic particle group 34 is positioned on the back surface substrate 22 side (non-image forming portion) enters a state where a white background is displayed by the non-electrophoretic particle group 36.

—Compound Having Neutral Polar Group and Hydrophobic Group—

The compound having a neutral polar group and a hydrophobic group contained in the dispersion liquid for electrophoretic display according to this exemplary embodiment is not particularly limited as long as when the compound is dissolved in a dispersion medium and added in a ratio of 0.01 to 1 mass % or about 0.01 to about 1 mass % based on the entire dispersion liquid, the proportion of electrophoretic particles having a polarity reverse to the original polarity in the electrophoretic particle group is reduced and at the same time, the non-electrophoretic particle is not changed into an electrophoretic particle.

Incidentally, the neutral polar group as used in this exemplary embodiment means a non-acidic and non-basic polar group. The neutral polar group specifically includes a hydroxyl group, an alkyl ether group, a weak acid group neutralized with a weak base, and a weakly basic group neutralized with a weak acid group.

If the content of the compound having a neutral polar group and a hydrophobic group in the display dispersion liquid is less than 0.01 mass % or less than about 0.01 mass %, the effect of regulating the polarity of the electrophoretic particle is not obtained, whereas if the content exceeds 1.0 mass % or about 1.0 mass %, deterioration of the polarity or increase of the viscosity is incurred, leading to reduction in the display characteristics.

Specific examples of the compound having a neutral polar group and a hydrophobic group used in this exemplary embodiment include, but are not limited to, the followings.

(Compound Having Hydroxyl Group)

Examples of the compound having a hydroxyl group, where, for example, the hydrophobic group is a silicone-containing group, include carbinol-modified silicone X-22-170DX (produced by Shin-Etsu Silicone) having a hydroxyl group at one terminal of a linear silicone oil, carbinol-modified silicone X-22-160AS (produced by Shin-Etsu Silicone) having a hydroxyl group at both terminals, and carbinol-modified silicone X-22-4039 (produced by Shin-Etsu Silicone) having a hydroxyl group on the side chain. Examples of the compound where the hydrophobic group is an alkyl group include a higher alcohol such as n-hexadecanol and n-octadecanol.

(Compound Having Alkyl Ether Group)

Examples of the compound having an alkyl ether group include polyether-modified silicone KF-6017 (produced by Shin-Etsu Silicone) having a polyether chain on the side chain of a linear silicone oil, KF-6028 (produced by Shin-Etsu Silicone) having a polyether chain on the side chain of a branched silicone oil, and KF-6038 (produced by Shin-Etsu Silicone) having a polyether chain and an alkyl chain on the side chain of a branched silicone oil.

Examples of the compound where the hydrophobic group is an alkyl group include:

polyoxyalkylene alkylphenol ethers such as polyoxyethylene nonylphenol ether and polyoxyethylene octylphenyl ether, polyoxyalkylene ethers such as polyoxyethylene acetyl ether and polyoxypropylene ether, glycols such as monool-type polyoxyalkylene glycol, diol-type polyoxyalkylene glycol and triol-type polyoxyalkylene glycol, alkyl alcohol ethers such as primary linear alcohol ethoxylate (e.g., octylphenol ethoxylate) and secondary linear alcohol ethoxylate, polyoxyalkylene alkyl esters such as polyoxyethylene lauryl ester, sorbitan fatty acid esters such as sorbitan monolaurate, sorbitan dilaurate and sorbitan sesquipalmitate, and polyoxyethylene sorbitan esters such as polyoxyethylene sorbitan monolaurate, polyoxyethylene sorbitan dilaurate and polyoxyethylene sorbitan sesquilaurate.

(Compound Having Weak Acid Group Neutralized with Weak Base)

The compound having a weak acid group neutralized with a weak base includes, for example, a salt obtained by neutralizing a carboxyl group-containing polysiloxane with an amine.

The carboxyl group-containing polysiloxane includes, but is not limited to, for example, a polysiloxane having a structure represented by the following formula (I):

(I)

In formula (I), $R^1$ represents H or Me, $R^2$ represents $(CH_2)_m$ (wherein m is an integer of 0 to 20), and n represents an integer of 1 to 100.

Also, the amine includes, but is not limited to, those represented by the following formulae (II-1) to (II-5):

More specifically, examples of the compound include a triethylamine salt of carboxylic acid-modified silicone X-22-3710 (produced by Shin-Etsu Silicone) having a carboxylic acid group at one terminal of a linear silicone oil, an amine salt represented by formula (II-3) of carboxylic acid-modified silicone X-22-3710, a triethylamine salt of carboxylic acid-modified silicone X-22-3701 (produced by Shin-Etsu Silicone) having a carboxylic acid group on the side chain of a linear silicone oil, and a triethylamine salt of carboxylic acid-modified silicone X-22-162C (produced by Shin-Etsu Silicone) having a carboxylic acid group at both terminals of a linear silicone oil.

Examples of the compound other than the silicone type include an ammonium salt, a trialkylamine salt such as triethylamine salt and tributylamine salt, and a trialkanolamine salt such as triethanolamine salt, of a long chain fatty acid such as dodecanoic acid, hexadecanoic acid and octadecanoic acid.

(Compound Having Weakly Basic Group Neutralized with Weak Acid Group)

The compound having a weakly basic group neutralized with a weak acid group includes, for example, a carboxylate such as acetate and formate of amino-modified silicone KF-868 (produced by Shin-Etsu Silicone).

Examples of the hydrophobic group of the compound having a neutral polar group and a hydrophobic group include an alkyl group, an alkyl halide group such as fluoroalkyl group, and a silicone group having a silicone chain such as dimethyl silicone, methylphenyl silicone and methyl hydrogen silicone.

The content of the compound having a neutral polar group and a hydrophobic group, based on the entire display dispersion liquid, varies depending on the kind of each of the compound, the dispersion medium, the electrophoretic particle and the non-electrophoretic particle but is preferably from 0.01 to 1 mass % or from about 0.01 to about 1 mass %, more preferably from 0.05 to 0.5 mass % or about 0.05 to about 0.5 mass %.

Incidentally, from the standpoint of suppressing aggregation of particles, in the case of using a silicone-based oil as the dispersion medium 50, the compound having a neutral polar group and a hydrophobic group is preferably a compound having a siloxane bond-containing group as the hydrophobic group. On the other hand, in the case of using a hydrocarbon-based oil as the dispersion medium 50, the compound having a neutral polar group and a hydrophobic group is preferably a compound having an alkyl group as the hydrophobic group.

The display medium 12 and the display device 10 of this exemplary embodiment are used, for example, in a bulletin board, a circular notice, an electronic blackboard, an advertising display, a signboard, a blinking indicator, an electronic paper, an electronic newspaper, an electronic book, and a document sheet for common use with a copier or the like, on each of which an image can be stored and rewritten.

Incidentally, the configurations of the display device 10 and the display medium 12, and the constituent materials and the like of the dispersion medium 50, the electrophoretic particle group 34 and the non-electrophoretic particle group 36, described in this exemplary embodiment, are an example and may be set according to usage or the like.

Furthermore, in the above, the display medium 12 and the display device 10 according to this exemplary embodiment are described by mainly referring to a mode where one kind (one color) of a particle group is applied as the electrophoretic particle group 34, but a mode where two or more kinds (two or more colors) of electrophoretic groups are applied may be also employed.

EXAMPLES

The present invention is described below by referring to Examples, but the present invention is not limited to these Examples. In the following description, unless otherwise indicated, the "parts" and "%" mean "parts by mass" and "mass %", respectively.

Example 1

Production of Cyan Particle

1) Production of Core Particle
—Preparation of Dispersed Phase—
The following components were mixed under heating at 60° C. to prepare a dispersed phase such that the solid content concentration as the total of the resin and the pigment was 15 mass % and the pigment concentration after drying was 50 mass %.

| | |
|---|---|
| Styrene acrylic polymer X345 (produced by Seiko PMC Corp.) | 7.2 g |
| A water dispersion of Cyan Pigment PB 15:3, Emacol SF Blue H524F (produced by Sanyo Color Works, Ltd., solid content: 26 mass %) | 18.8 g |
| Distilled water | 24.1 g |

—Preparation of Continuous Phase—
The following components were mixed to prepare a continuous phase.

| | |
|---|---|
| Surfactant KF-6028 (produced by Shin-Etsu Silicone) | 3.5 g |
| Silicone oil KF-96-2cs (produced by Shin-Etsu Silicone) | 346.5 g |

—Production of Particle—
50 g of the dispersed phase and 350 g of the continuous phase was mixed, and the mixture was emulsified using an inner gear-type bench disperser, ROBOMICS (manufactured by Tokushu Kika Kogyo Co., Ltd.), at a rotation speed of 10,000 rpm and a temperature of 30° C. for 10 minutes. As a result, an emulsified liquid having an emulsion droplet diameter of about 2 μm was obtained. The emulsified liquid was dried using a rotary evaporator at a vacuum degree of 20 mbar and a water bath temperature of 40° C. for 18 hours.

The obtained particle suspension liquid was centrifuged at 6,000 rpm for 15 minutes and after removing the supernatant solution, a washing step of causing redispersion by using silicone oil KF-96-2CS was repeated three times. In this way, 6 g of a core particle was obtained. As a result of SEM image analysis, the average particle diameter was found to be 0.6 μm.

2) Formation of Shell (Coacervation Method)
—Synthesis of Resin for Shell Formation—
The following components were mixed, and the mixture was subjected to polymerization at 70° C. for 6 hours under nitrogen.

| | |
|---|---|
| SILAPLANE FM-0721 (produced by Chisso Corp.) | 50 g |
| Hydroxyethyl methacrylate (produced by Aldrich Chemical Co., Inc.) | 32 g |
| Phenoxy group-containing monomer AMP-10G (produced by Shin-Nakamura Chemical Co., Ltd.) | 18 g |
| Block isocyanate group-containing monomer Karenz MOI-BP (produced by Showa Denko K.K.) | 2 g |
| Isopropyl alcohol (produced by Kanto Chemical Co., Inc.) | 200 g |
| Polymerization initiator AIBN (2,2'-azobisisobutyronitrile, produced by Aldrich Chemical Co., Inc.) | 0.2 g |

The resulting product was purified using cyclohexane as the reprecipitation solvent and dried to obtain a resin for shell formation, and 2 g of the resin for shell formation was dissolved in 20 g of a tert-butanol solvent to produce a resin solution for shell formation. Here, the phenoxy group in the resin component for shell formation is the positively charged group, and the charge amount of the particle can be controlled by the introduction amount of the phenoxy group.
—Coating of Particle with Resin for Shell Formation—
1 g of the core particle was weighed in a 200-mL eggplant flask and after adding 15 g of silicone oil KF-96-2cs, the particles were dispersed with stirring while applying an ultrasonic wave. To the dispersion, 7.5 g of tert-butanol, 22 g of the resin solution for shell formation, and 12.5 g of silicone oil KF-96-2cs were sequentially added. In all additions, the charging rate was 2 mL/s.

By connecting the eggplant flask to a rotary evaporator, removal of tert-butanol was performed at a vacuum degree of 20 mbar and a water bath temperature of 50° C. for 1 hour.

The residue was heated with stirring in an oil bath. First, heating was performed at 100° C. for 1 hour to remove the residual water and the residual tert-butanol, and subsequently, heating at 130° C. for 1.5 hours was performed to eliminate the block group of the block isocyanate group and perform a crosslinking reaction of the material for shell formation.

After cooling, the obtained particle suspension liquid was centrifuged at 6,000 rpm for 15 minutes and after removing the supernatant solution, a washing step of causing redispersion by using silicone oil KF-96-2CS was repeated three times. In this way, 0.6 g of a positively charging cyan particle was obtained.

The volume average particle diameter of the obtained cyan particle was 550 nm.
(Production of White Particle)
In a 500-ml three-neck flask with a reflux condenser, 45 g of 2-vinylnaphthalene (produced by Nippon Steel Chemical Co., Ltd.), 45 g of SILAPLANE FM-0721 (produced by Chisso Corp.) and 240 g of silicone oil KF-96L-1CS (produced by Shin-Etsu Silicone) were added. After raising the temperature to 65° C. and bubbling the system with a nitrogen gas for 15 minutes, 2.3 g of lauroyl peroxide (produced by Aldrich Chemical Co., Inc.) was charged, and polymerization was performed at 65° C. for 24 hours in a nitrogen atmosphere.

The obtained particle suspension liquid was centrifuged at 8,000 rpm for 10 minutes and after removing the supernatant solution, a washing step of causing redispersion by using silicone oil KF-96-2CS (produced by Shin-Etsu Silicone) was repeated three times. Finally, the solid content concentration was adjusted to 40 mass % by a silicone oil to obtain a white particle dispersion liquid. The volume average particle diameter was 450 nm. The charge amount measured when the dispersion liquid was diluted to 20 mass % and enclosed in a cell having an area of 1 cm$^2$ and a cell gap of 50 μm was as low as 1 nC, revealing that there was almost no electric charge. Also, migration of the particle was examined by a microscope, but migration was not observed.

(Preparation of Cyan•White Mixed Particle Dispersion Liquid)

The cyan particle and the white particle were weighed/mixed to contain, in terms of solid content, 0.1 g of the cyan particle, 2.5 g of the white particle, and 0.01 g of carbinol-modified silicone X-22-170DX (produced by Shin-Etsu Silicone) that is a compound having a hydroxyl group as the neutral polar group, and after adding silicone oil KF-96L-2cs (produced by Shin-Etsu Silicone) to make a liquid amount of 10 g, the mixture was ultrasonically stirred and used as a cyan•white mixed particle dispersion liquid (display dispersion liquid). The concentration of the compound containing a neutral polar group and a hydrophobic group was 0.1 mass %.

(Preparation of White Particle Dispersion Liquid)

The white particle and carbinol-modified silicone X-22-170DX (produced by Shin-Etsu Silicone) were weighed/mixed to be contained in amounts of 2.5 g and 0.01 g, respectively, and after adding silicone oil KF-96L-2cs (produced by Shin-Etsu Silicone) to make a liquid amount of 50 g, the mixture was ultrasonically stirred and used as a white particle dispersion liquid.

(Production of Cell for Evaluation)

—Production of Display Medium Cell for Evaluation)

On a glass substrate (ITO substrate) having deposited thereon 50 nm-thick ITO (indium tin oxide) as an electrode, a solution of fluororesin Cytop (produced by Asahi Glass Company, Ltd.) was spin-coated and dried at 130° C. for 1 hour to form a surface layer having a film thickness of 80 nm.

Two sheets of the thus-produced ITO substrate with a surface layer were prepared and used as a display substrate and a back surface substrate. The display substrate was put on the back surface substrate with their surface layers facing each other by using a 50 thick Teflon (registered trademark) sheet as a spacer and fixed by clips. The cyan•white mixed particle dispersion liquid was poured into the thus-produced empty cell for evaluation, and the cell was used as a cell for evaluation.

(Evaluation of Reflectance)

Using the cell for evaluation produced above, a potential difference of 15 V was applied between electrodes for 5 seconds such that the display-side electrode serves as the negative electrode. The positively charged cyan particle dispersed was moved toward the negative electrode side, that is, the display-side electrode side, and when watched from the display substrate side, a cyan color was observed. The optical density Dc at this time was measured using a spectrophotometric colorimeter (X-Rite 939, manufactured by X-Rite).

Subsequently, a potential difference of 15 V was applied between the electrodes for 5 seconds such that the display-side electrode serves as the positive electrode, as a result, the positively charged cyan particle was moved toward the negative electrode side, that is, the back surface-side electrode side, and when watched from the display substrate side, a white color was observed. The optical density Dw at this time was measured using a spectrophotometric colorimeter (X-Rite 939, manufactured by X-Rite).

Furthermore, the optical density Dw0 of a cell for evaluation in which only a white particle was enclosed at the same concentration was measured in the same manner. Assuming that the difference between the optical density Dw0 and the optical densities Dc and Dw is proportional to the number of particles, the ratio X of the number of reverse-polarity particles was calculated according to the following formula:

$$X=(Dw-Dw0)/(Dc+Dw-2Dw0)$$

(Observation of White Particle Migration)

Figure 2:
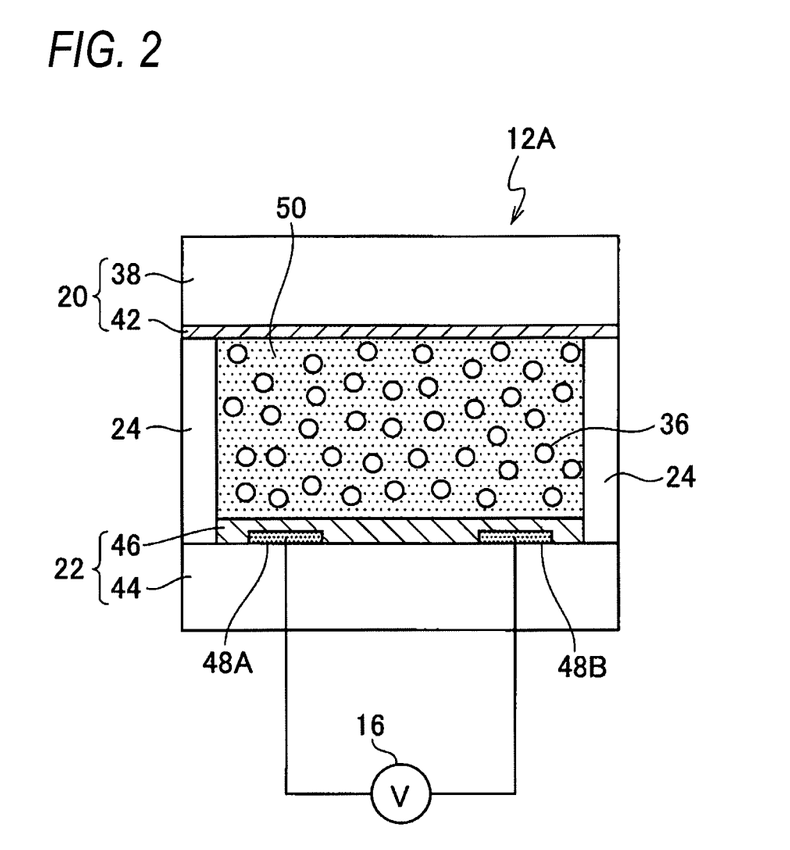

As shown in FIG. 2, a glass substrate 44 having deposited thereon 50 nm-thick ITO (indium tin oxide) as an electrode was photo-etched for patterning striped electrodes 48A and 48B arranged in parallel with a distance of 500 μm. A solution of fluororesin Cytop (produced by Asahi Glass Company, Ltd.) was spin-coated thereon and dried at 130° C. for 1 hour to form a surface layer 46 having a film thickness of 80 nm, whereby a substrate 22 was produced.

On the other hand, a solution of fluororesin Cytop (produced by Asahi Glass Company, Ltd.) was spin-coated on a glass substrate 38 and dried at 130° C. for 1 hour to form a surface layer 42 having a film thickness of 80 nm, whereby a substrate 20 was produced.

The substrate 20 and the substrate 22 were put on one on another by using a 50 μm-thick Teflon (registered trademark) sheet as a spacer 24 and fixed by clips. The white particle dispersion liquid prepared above was poured into the thus-produced cell 12A for in-plane evaluation and evaluated. Under microscopic observation, a dc voltage of 150 V was applied between those two striped electrodes 48A and 48B for 5 seconds, and the presence or absence of migration of the white particle was examined.

Example 2

A sample was produced and evaluated in the same manner as in Example 1 except for using 0.1 g of carbinol-modified silicone X-22-170DX in place of 0.01 g of carbinol (n-alkyl alcohol)-modified silicone X-22-170DX. The concentration of the compound having a neutral polar group and a hydrophobic group was 1 mass %.

Example 3

1 g of carboxylic acid-modified silicone X-22-3710 and 9 g of 2-propanol (produced by Kanto Chemical Co., Inc.) were mixed and after adding 0.1 g of triethylamine (produced by Wako Pure Chemical Industries, Ltd.) thereto, the mixture was stirred for 1 hour. The resulting solution was charged into 100 g of water, and the carboxylic acid-modified silicone X-22-3710 was isolated on the water surface. In the same manner, dissolution in 2-propanol and charging and isolation in water were repeated three times, and by finally performing drying under reduced pressure at 60° C. for 2 hours, a carboxylic acid-modified silicone•triethylamine salt was synthesized.

A sample was produced and evaluated in the same manner as in Example 1 except for using 0.01 g of the carboxylic acid-modified silicone•triethylamine salt obtained above in place of 0.01 g of carbinol-modified silicone X-22-170DX in Example 1. The concentration of the compound having a neutral polar group and a hydrophobic group was 0.1 mass %.

Example 4

A sample was produced and evaluated in the same manner as in Example 3 except for using 0.1 g of the carboxylic acid-modified silicone•triethylamine salt in place of 0.01 g of the carboxylic acid-modified silicone•triethylamine salt. The concentration of the compound having a neutral polar group and a hydrophobic group was 1 mass %.

Example 5

A sample was produced and evaluated in the same manner as in Example 3 except for using an amino compound represented by the following formula (II-3) in place of triethylamine. The concentration of the compound having a neutral polar group and a hydrophobic group was 0.1 mass %.

(II-3)

Example 6

A sample was produced and evaluated in the same manner as in Example 1 except for using 0.01 g of polyether-modified KF-6017 (produced by Shin-Etsu Silicone) in place of 0.01 g of carbinol-modified silicone X-22-170DX. The concentration of the compound having a neutral polar group and a hydrophobic group was 0.1 mass %.

Example 7

1 g of amino-modified silicone KF-868 (produced by Shin-Etsu Silicone) and 9 g of 2-propanol (produced by Kanto Chemical Co., Inc.) were mixed and after adding 0.1 g of acetic acid (produced by Wako Pure Chemical Industries, Ltd.) thereto, the mixture was stirred for 1 hour. The resulting solution was charged into 100 g of water, and the amino-modified silicone KF-868 was isolated on the water surface. In the same manner, dissolution in 2-propanol and charging and isolation in water were repeated three times, and by finally performing drying under reduced pressure at 60° C. for 2 hours, an amino-modified silicone•acetate was synthesized. A sample was produced and evaluated in the same manner as in Example 1 except for using 0.01 g of the amino-modified silicone•acetate synthesized in place of 0.01 g of carbinol-modified silicone X-22-170DX in Example 1. The concentration of the compound having a neutral polar group and a hydrophobic group was 0.1 mass %.

Example 8

A sample was produced and evaluated in the same manner as in Example 1 except for using hydrocarbon-based solvent ISOPAR M (produced by Exxon Mobil Corp.) in place of silicone oil KF-96L-2cs (produced by Shin-Etsu Silicone) used for the preparation of a cyan•white mixed particle dispersion liquid and a white particle dispersion liquid.

Example 9

1 g of stearic acid (produced by Aldrich Chemical Co., Inc.) and 9 g of 2-propanol (produced by Kanto Chemical Co., Inc.) were mixed and after adding 0.1 g of triethylamine (produced by Wako Pure Chemical Industries, Ltd.) thereto, the mixture was stirred for 1 hour. The resulting solution was charged into 100 g of water, and the stearic acid was isolated on the water surface. In the same manner, dissolution in 2-propanol and charging and isolation in water were repeated three times, and by finally performing drying under reduced pressure at 60° C. for 2 hours, a triethylamine stearate was synthesized. A sample was produced and evaluated in the same manner as in Example 1 except for using 0.01 g of the triethylamine stearate in place of 0.01 g of carbinol-modified silicone X-22-170DX in Example 1. The concentration of the compound having a neutral polar group and a hydrophobic group was 0.1 mass %.

Example 10

A sample was produced and evaluated in the same manner as in Example 9 except for using hydrocarbon-based solvent ISOPAR M (produced by Exxon Mobil Corp.) in place of silicone oil KF-96L-2cs (produced by Shin-Etsu Silicone) used for the preparation of a cyan•white mixed particle dispersion liquid and a white particle dispersion liquid.

Example 11

A sample was produced and evaluated in the same manner as in Example 1 except for using 0.001 g of carbinol-modified silicone X-22-170DX in place of 0.01 g of carbinol (n-alkyl alcohol)-modified silicone X-22-170DX. The concentration of the compound having a neutral polar group and a hydrophobic group was 0.01 mass %.

Example 12

A sample was produced and evaluated in the same manner as in Example 3 except for using 0.001 g of the carboxylic acid-modified silicone•triethylamine salt in place of 0.01 g of the carbinol-modified silicone•triethylamine salt. The concentration of the compound having a neutral polar group and a hydrophobic group was 0.01 mass %.

Comparative Example 1

A sample was produced and evaluated in the same manner as in Example 1 except for not adding 0.01 g of carbinol-modified silicone X-22-170DX.

Comparative Example 2

1 g of carboxylic acid-modified silicone X-22-3710 (produced by Shin-Etsu Silicone) and 9 g of 2-propanol (produced by Kanto Chemical Co., Inc.) were mixed and after adding 0.1 g of sodium p-toluenesulfonate (produced by Wako Pure Chemical Industries, Ltd.) thereto, the mixture was stirred for 1 hour. The resulting solution was charged into 100 g of water, and the carboxylic acid-modified silicone X-22-3710 was isolated on the water surface. In the same manner, dissolution in 2-propanol and charging and isolation in water were repeated three times, and by finally performing drying under reduced pressure at 60° C. for 2 hours, a carboxylic acid-modified silicone•sodium salt was synthesized.

A sample was produced and evaluated in the same manner as in Example 1 except for using 0.01 g of the carboxylic acid-modified silicone•sodium salt as a weak acid-strong base salt in place of 0.01 g of carbinol-modified silicone X-22-170DX in Example 1. The concentration of the compound having a neutral polar group and a hydrophobic group was 0.1 mass %.

Comparative Example 3

A sample was produced and evaluated in the same manner as in Example 1 except for using 0.01 g of sodium bis-(2-ethylhexyl)sulfosuccinate (popular name: AOT, produced by Aldrich Chemical Co., Inc.) as a strong acid-strong base salt in place of 0.01 g of carbinol-modified silicone X-22-170DX.

The concentration of the compound having a neutral polar group and a hydrophobic group was 0.1 mass %.

Comparative Example 4

1 g of amino-modified silicone KF-868 (produced by Shin-Etsu Silicone) and 9 g of 2-propanol (produced by Kanto Chemical Co., Inc.) were mixed and after adding 0.1 g of p-toluenesulfonic acid (produced by Wako Pure Chemical Industries, Ltd.) thereto, the mixture was stirred for 1 hour. The resulting solution was charged into 100 g of water, and the amino-modified silicone KF-868 was isolated on the water surface. In the same manner, dissolution in 2-propanol and charging and isolation in water were repeated three times, and by finally performing drying under reduced pressure at 60° C. for 2 hours, an amino-modified silicone•toluenesulfonate was synthesized.

A sample was produced and evaluated in the same manner as in Example 1 except for using 0.01 g of the synthesized amino-modified silicone•toluenesulfonate as a weak base-strong acid salt in place of 0.01 g of carbinol-modified silicone X-22-170DX in Example 1. The concentration of the compound having a neutral polar group and a hydrophobic group was 0.1 mass %.

Comparative Example 5

A sample was produced and evaluated in the same manner as in Example 1 except for using 0.0005 g of carbinol-modified silicone X-22-170DX in place of 0.01 g of carbinol-modified silicone X-22-170DX. The concentration of the compound having a neutral polar group and a hydrophobic group was 0.005 mass %.

Comparative Example 6

A sample was produced and evaluated in the same manner as in Example 1 except for using 1 g of carbinol-modified silicone X-22-170DX in place of 0.01 g of carbinol-modified silicone X-22-170DX. The concentration of the compound having a neutral polar group and a hydrophobic group was 10 mass %.

Comparative Example 7

A sample was produced and evaluated in the same manner as in Example 3 except for using 0.0005 g of the carboxylic acid-modified silicone•triethylamine salt in place of 0.01 g of the carboxylic acid-modified silicone•triethylamine salt. The concentration of the compound having a neutral polar group and a hydrophobic group was 0.005 mass %.

Comparative Example 8

A sample was produced and evaluated in the same manner as in Example 3 except for using 1 g of the carboxylic acid-modified silicone•triethylamine salt in place of 0.01 g of the carboxylic acid-modified silicone•triethylamine salt. The concentration of the compound having a neutral polar group and a hydrophobic group was 10 mass %.

Comparative Example 9

A sample was produced and evaluated in the same manner as in Example 1 except for using 0.2 g of carbinol-modified silicone X-22-170DX in place of 0.01 g of carbinol-modified silicone X-22-170DX. The concentration of the compound having a neutral polar group and a hydrophobic group was 2 mass %.

Comparative Example 10

A sample was produced and evaluated in the same manner as in Example 3 except for using 0.2 g of the carboxylic acid-modified silicone•triethylamine salt in place of 0.01 g of the carboxylic acid-modified silicone•triethylamine salt. The concentration of the compound having a neutral polar group and a hydrophobic group was 2 mass %.

The compositions and evaluation results of the display dispersion mediums in Examples and Comparative Examples are shown in Table 1.

TABLE 1

| | Compound Having Polar Group | | | | | Ratio of Number of | |
|---|---|---|---|---|---|---|---|
| | Type | Polar Group | Hydrophobic Group | Concentration (mass %) | Dispersion Medium | Reverse-Polarity Particles (%) | Migration of White Particle |
| Example 1 | X-22-170DX | carbinol | silicone | 0.1 | silicone oil | 12.4 | none |
| Example 2 | X-22-170DX | carbinol | silicone | 1 | silicone oil | 8.1 | none |
| Example 3 | TEA salt of X-22-3710 | weak acid-weak base salt | silicone | 0.1 | silicone oil | 10.4 | none |
| Example 4 | TEA salt of X-22-3710 | weak acid-weak base salt | silicone | 1 | silicone oil | 12.7 | none |
| Example 5 | salt of amine compound represented by formula (II-3) of X-22-3710 | weak acid-weak base salt | silicone | 0.1 | silicone oil | 9.6 | none |
| Example 6 | KF-6017 | alkyl ether | silicone | 0.1 | silicone oil | 12.5 | none |
| Example 7 | acetate of KF-868 | weak base-weak acid salt | silicone | 0.1 | silicone oil | 12.3 | none |
| Example 8 | TEA salt of X-22-3710 | weak acid-weak base salt | silicone | 0.1 | ISOPAR M | 12.1 | none |
| Example 9 | TEA salt of octadecanoic acid | weak acid-weak base salt | alkyl | 0.1 | silicone | 11.6 | none |
| Example 10 | TEA salt of octadecanoic acid | weak acid-weak base salt | alkyl | 0.1 | ISOPAR M | 12.2 | none |
| Example 11 | X-22-170DX | carbinol | silicone | 0.01 | silicone oil | 12.7 | none |
| Example 12 | TEA salt of X-22-3710 | weak acid-weak base salt | silicone | 0.01 | silicone oil | 11.6 | none |
| Comparative Example 1 | — | none | none | 0 | silicone oil | 13.0 | none |
| Comparative Example 2 | Na salt of X-22-3710 | weak acid-strong base salt | silicone | 0.1 | silicone oil | 39.2 | observed |
| Comparative Example 3 | AOT | strong acid-strong base salt | silicone | 0.1 | silicone oil | 10.5 | observed |
| Comparative Example 4 | toluenesulfonate of KF-868 | weak base-strong acid salt | silicone | 0.1 | silicone oil | 45.3 | observed |

TABLE 1-continued

| | Compound Having Polar Group | | | | | Ratio of Number of | |
|---|---|---|---|---|---|---|---|
| | Type | Polar Group | Hydrophobic Group | Concentration (mass %) | Dispersion Medium | Reverse-Polarity Particles (%) | Migration of White Particle |
| Comparative Example 5 | X-22-170DX | carbinol | silicone | 0.005 | silicone oil | 13.0 | none |
| Comparative Example 6 | X-22-170DX | carbinol | silicone | 10 | silicone oil | 22.6 | observed |
| Comparative Example 7 | TEA salt of X-22-3710 | weak acid-weak base salt | silicone | 0.005 | silicone oil | 13.1 | none |
| Comparative Example 8 | TEA salt of X-22-3710 | weak acid-weak base salt | silicone | 10 | silicone oil | 56.4 | observed |
| Comparative Example 9 | X-22-170DX | carbinol | silicone | 2 | silicone oil | 14.4 | observed |
| Comparative Example 10 | TEA salt of X-22-3710 | weak acid-weak base salt | silicone | 2 | silicone oil | 19.8 | observed |

Carbinol: methanol
TEA: triethylamine
X-22-170DX: carbinol-modified silicone X-22-170DX (produced by Shin-Etsu Silicone)
KF-6017: polyether-modified silicone KF-6017 (produced by Shin-Etsu Silicone)
KF-868: amino-modified silicone KF-868 (produced by Shin-Etsu Silicone)
X-22-3710: carboxylic acid-modified silicone X-22-3710 (produced by Shin-Etsu Silicone)
AOT: sodium bis-(2-ethylhexyl)sulfosuccinate In all of Examples 1 to 12 where a compound having a neutral polar group and a hydrophobic group was added, the ratio of the number of reverse-polarity particles was reduced and migration of the white particle was not observed, as compared with Comparative Example 1 where the compound was not added.

On the other hand, in both of Comparative Example 2 using a weak acid-strong base salt and Comparative Example 4 using a weak acid-strong base salt, the ratio of the number of reverse-polarity particles was increased and migration of the white particle was observed as compared with Comparative Example 1. In Comparative Example 3 using a strong acid-strong base salt, the ratio of the number of reverse-polarity particles was more reduced than in Comparative Example 1 but migration of the white particle was observed.

In both of Comparative Examples 5 and 7 where the ratio of the compound having a neutral polar group and a hydrophobic group was as small as 0.005 mass %, the ratio of the number of reverse-polarity particles was not improved as compared with Comparative Example 1.

Also, in all of Comparative Examples 9 and 10 where the ratio of the compound having a neutral polar group and a hydrophobic group was as large as 2 mass % and Comparative Examples 6 and 8 where the ratio was as large as 10 mass %, the ratio of the number of reverse-polarity particles was increased and migration of the white particle was observed as compared with Comparative Example 1.

What is claimed is:

1. A dispersion liquid for electrophoretic display, comprising:
   a dispersion medium,
   a colored electrophoretic particle group that is dispersed in the dispersion medium and migrates in the dispersion medium according to an electric field,
   a non-electrophoretic particle group that is dispersed without migrating in the dispersion medium and has a color different from that of the electrophoretic particle group, and
   a compound having a neutral polar group and a hydrophobic group, which is contained in the dispersion medium in a ratio of about 0.01 to about 1 mass % based on the entire dispersion liquid.

2. The dispersion liquid for electrophoretic display according to claim 1,
   wherein the neutral polar group is a hydroxyl group, an alkyl ether group, a weak acid group neutralized with a weak base, or a weakly basic group neutralized with a weak acid group.

3. The dispersion liquid for electrophoretic display according to claim 1,
   wherein a silicone-based oil is contained as the dispersion medium and the compound having a neutral polar group and a hydrophobic group has a siloxane bond-containing group as the hydrophobic group.

4. The dispersion liquid for electrophoretic display according to claim 1,
   wherein a hydrocarbon-based oil is contained as the dispersion medium and the compound having a neutral polar group and a hydrophobic group has an alkyl group as the hydrophobic group.

5. A display medium comprising:
   a pair of substrates disposed with spacing, at least either one of which has light transparency, and
   the dispersion liquid for electrophoretic display according to claim 1, which is enclosed between the pair of substrates.

6. A display medium comprising:
   a pair of electrodes disposed with spacing, at least either one of which has light transparency, and
   a region having the dispersion liquid for electrophoretic display according to claim 1 between the pair of electrodes.

7. A display device comprising:
   the display medium according to claim 5, and
   an electric field applying unit that applies a voltage between the pair of substrates of electrodes of the display medium.

8. A display device comprising:
   the display medium according to claim 6, and
   an electric field applying unit that applies a voltage between the pair of electrodes of the display medium.

* * * * *